United States Patent [19]

Tanaka

[11] Patent Number: 4,802,454

[45] Date of Patent: Feb. 7, 1989

[54] DEVICE FOR CONTROLLING IGNITION TIMING IN INTERNAL COMBUSTION ENGINE

[75] Inventor: Akira Tanaka, Wako, Japan

[73] Assignee: Honda Giken Kogyo Kabushiki Kaisha, Tokyo, Japan

[21] Appl. No.: 10,875

[22] Filed: Feb. 4, 1987

[30] Foreign Application Priority Data

Feb. 19, 1986 [JP] Japan .................................. 61-34330

[51] Int. Cl.⁴ ........................ G01L 23/22; F02P 5/145
[52] U.S. Cl. ....................................... 123/425; 73/35;
73/115
[58] Field of Search ..................... 123/425, 435; 73/35,
73/115

[56] References Cited

U.S. PATENT DOCUMENTS

| 4,413,599 | 11/1983 | Shigematsu et al. | 123/425 |
| 4,466,406 | 8/1984 | Hartung et al. | 123/435 |
| 4,481,925 | 11/1984 | Karau et al. | 123/435 |
| 4,501,137 | 2/1985 | Aoki et al. | 123/425 |
| 4,660,535 | 4/1987 | Asano | 123/425 |

FOREIGN PATENT DOCUMENTS

2743664 3/1978 Fed. Rep. of Germany .
2832594 2/1979 Fed. Rep. of Germany .
2939580 4/1981 Fed. Rep. of Germany .

Primary Examiner—Andrew M. Dolinar
Attorney, Agent, or Firm—Armstrong, Nikaido, Marmelstein & Kubovcik

[57] ABSTRACT

A device for controlling ignition timing in an internal combustion engine comprises a pressure sensor disposed in the vicinity of each combustion chamber and is able to determine both the maximum cylinder pressure angle and the presence/absence of knocking from the output of the pressure sensor by means of a single circuit. The circuit further calculates the deviation of the maximum cylinder pressure angle from a target maximum-pressure angle and in response to the deviation compensates the basic ignition timing separately for each cylinder. The compensation of deviation is carried out in increments whose magnitude varies with the amount of deviation.

12 Claims, 8 Drawing Sheets

DEVICE FOR CONTROLLING IGNITION TIMING IN INTERNAL COMBUSTION ENGINE

BACKGROUND OF THE INVENTION

1. Field of the Invention

This invention relates to a device for controlling ignition timing in an internal combustion engine, more specifically to a device for controlling ignition timing in an internal combustion engine on the basis of the detected state of combustion in the combustion chambers of the internal combustion engine.

2. Description of the Prior Art

It is well known that the output of the internal combustion engine becomes maximum when ignition is controlled to occur so that the crankshaft angle at which the cylinder pressure is maximum (this angle being referred to as $\theta$pmax in this specification) is in the vicinity of 15° ATDC (after top dead center). An example of a technique for maximizing engine output in this manner can be found in Japanese Unexamined Patent Publication No. 59(1984)-39974. In the technique disclosed by this prior art, one pressure sensor is provided for every two cylinders and the output of each pressure sensor is sent through a low frequency band pass filter to a sample hold circuit and then to an A/D converter where it is digitized once per degree of crankshaft rotation under the control of a timing signal from a crankshaft angle sensor. The digitally converted signal is input to the CPU (central processing unit) of a microcomputer which uses it to determine the maximum cylinder pressure angle, whereafter the deviation from the target maximum-pressure angle (ATDC 10°-15°) is corrected in angular increments of predetermined magnitude. Simultaneously, for the purpose of discriminating knocking on the basis of the output from the pressure sensor, this output is also passed through a high frequency band pass filter connected in parallel with the aforesaid low frequency band pass filter. The signal from this high frequency band pass filter is integrated in a circuit for producing a reference signal for knocking determination and the so-obtained knocking reference signal is sent to a comparator where it is compared with the output of the aforesaid filter. The result of this comparison is sent to the CPU where it is determined whether or not knocking is present. When knocking is found to be present, the ignition timing is retarded.

This prior art has the defect of requiring separate circuits for detecting the maximum cylinder pressure angle and the presence/absence of knocking, which necessitates the use of complicated and expensive device. Also, as the circuit arrangement is complex, the reliability of the operation is correspondingly low.

Moreover, although the ignition timing is regulated in response to the deviation between the maximum cylinder pressure angle and the target maximum-pressure angle, the size of the angular increments by which this regulation is made is always the same no matter how large or small the deviation may be. As a result, when the deviation is large, considerable time is required before the target maximum-pressure angle is reached, which tends to lower the engine output. It is not possible to overcome this problem simply by carrying out the regulation in large increments because this would result in abrupt changes in the ignition timing which would degrade the drivability of the vehicle driven by the engine.

At any rate, in this prior art reference, neither the regulation for elimination of knocking nor the regulation for elimination of the deviation in maximum cylinder pressure angle is carried out separately for each cylinder; both are carried out for all cylinders together. As a result, when knocking occurs, be it only in one cylinder, all of the cylinders including those in which knocking has not occurred are subjected to ignition timing delay. This tends to reduce the engine output unnecessary.

SUMMARY OF THE INVENTION

In consideration of the aforesaid shortcomings of the prior art, it is an object of the invention to provide a device for controlling the ignition timing in an internal combustion engine which enables detection of the maximum cylinder pressure and the presence/absence of knocking with a single circuit and, further, enables elimination of knocking by convergence of the maximum cylinder pressure angle toward the target maximum-pressure angle.

Another object of the invention is to provide a device for controlling the ignition timing in an internal combustion engine wherein the size of the angular increments, by which the deviation between the actual maximum cylinder pressure angle and the target maximum-pressure angle is eliminated, is variable, and more specifically, wherein the size of the increments is relatively large when the deviation is large and is relatively small when the deviation is small.

Another object of the invention is to provide a device for controlling the ignition timing in an internal combustion engine wherein more accurate and finer control of the ignition timing is enabled by determining the ignition timing separately for each cylinder.

The present invention provides to achieve the objects a device for controlling ignition timing in an internal combustion engine comprising combustion state detection means disposed in the vicinity of each combustion chamber of an internal combustion engine for detecting the state of combustion in the combustion chamber. A pulse generation means receives the output of the detection means as input and outputs pulses when pressure in the combustion chamber becomes maximum and when knocking occurs. A crankshaft angle detection means is disposed in the vicinity of a rotating member of the internal combustion engine for detecting the angular position of a crankshaft of the internal combustion engine. An ignition timing calculation means receives the output of the pulse generation means and the crankshaft angle detection means and calculates the ignition timing of the engine. An ignition means receives the output of the ignition timing calculation means and ignites a fuel and air mixture in the combustion chamber. The ignition timing calculation means counts the pulses produced by the pulse generation means and, when the number of counted pulses exceeds a predetermined value, determines if knocking has occurred and retards the ignition timing. When the number of counted pulses does not exceed the predetermined value, the ignition timer and calculation means determines the maximum cylinder pressure angle from the angular position at which the pulse was detected, calculates the deviation of the maximum cylinder pressure angle from a target angle and calculates an ignition timing for eliminating the deviation.

The above and other features of the present invention will become apparent from the following description made with reference to the drawings.

BRIEF DESCRIPTION OF THE DRAWINGS

FIGS. 2(a)(b) and (c) show waveform diagrams of the output of the maximum cylinder pressure angle signal/knocking signal generation circuit of the device shown in FIG. 1;

FIGS. 4(a) and (b) are waveform diagrams for explaining the method of knocking detection in the flowchart of FIG. 3;

FIGS. 9(a)(b) and (c) are waveform diagrams of the output of the device of FIG. 8.

DESCRIPTION OF THE PREFERRED EMBODIMENTS

Figure 1:
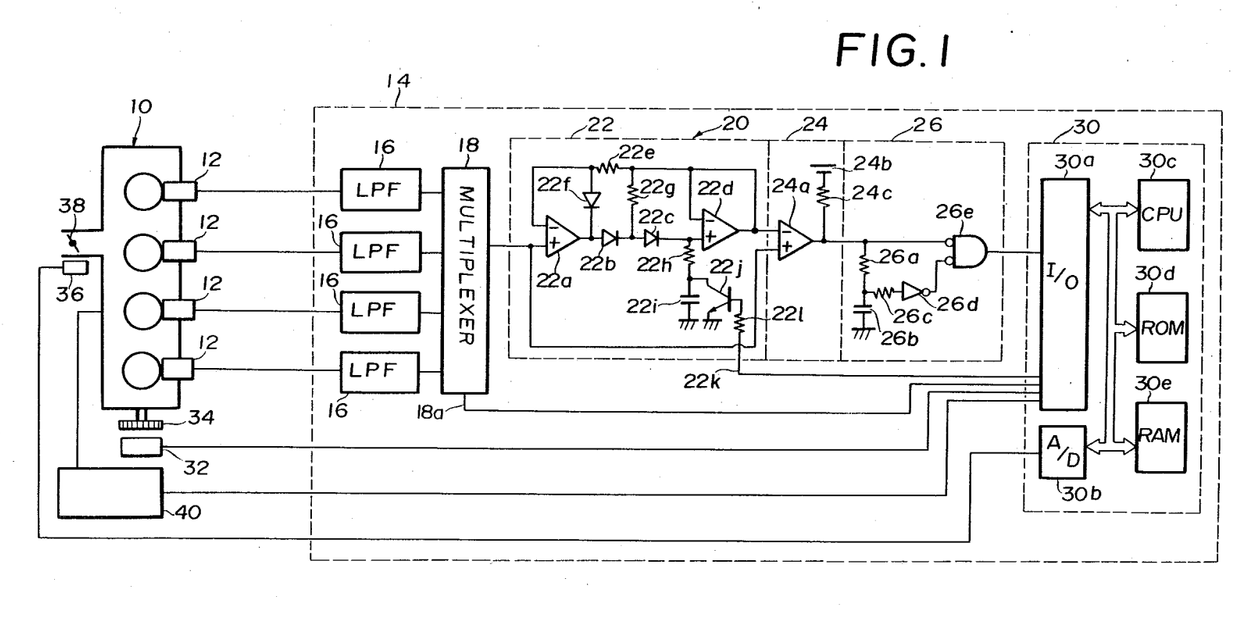
FIG. 1 is a block diagram of a device for controlling ignition timing in an internal combustion engine in accordance with the present invention.

In FIG. 1, the reference numeral 10 denotes a four-cylinder internal combustion engine. Piezoelectric pressure sensors 12 serving as means for detecting the state of combustion are disposed one for each cylinder so as to face into the combustion chamber of the cylinder. The outputs of the pressure sensors are passed through charge-voltage converters or high impedance circuits (neither shown) and then forwarded to a control unit 14 in which they are applied to low pass filters 16. The cut-off frequency of the low pass filters 16 is set higher than the knocking frequency so that they will pass the high frequency components caused by any knocking which occurs. The stage following the low pass filters 16 is a multiplexer 18 which is controlled by a CPU of a computer to be described later so as to forward the outputs from the filters 16 to the succeeding stage in the firing order of the cylinder.

Figure 2:
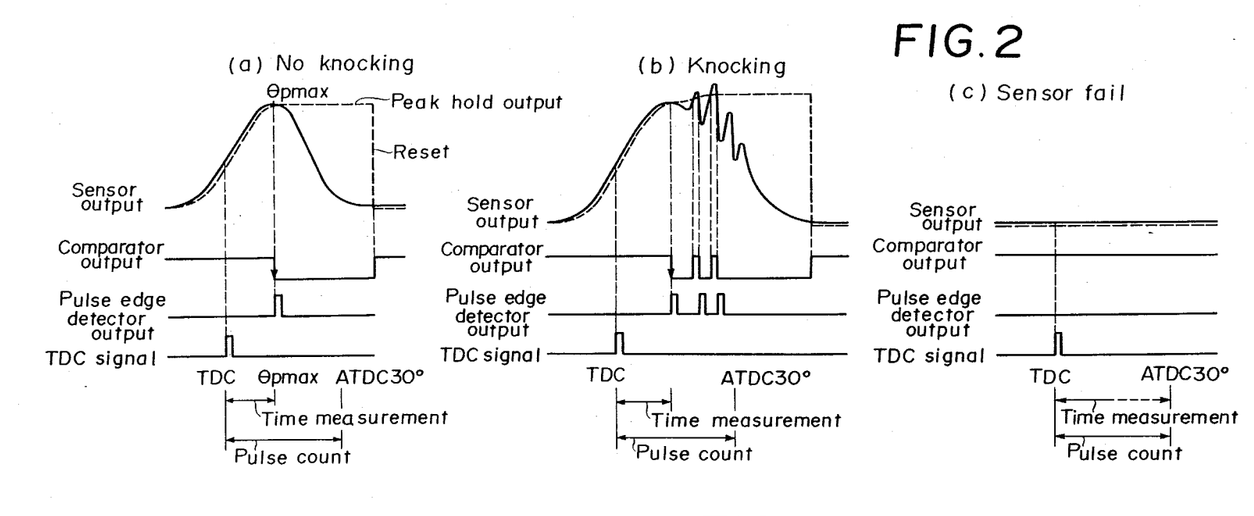

The next stage of the control unit 14 following the multiplexer 18 is a maximum cylinder pressure signal/knocking signal generator circuit 20 which is constituted of a peak hold circuit 22, a comparator 24 and a pulse trailing edge detector 26. The output from the multiplexer 18 is first input to the peak hold circuit 22 which holds the peak output of the multiplexer 18 and produces an output as shown in FIG. 2. The circuit 22 includes a first operational amplifier 22a which receives the output of the multiplexer 18 on its non-inverting input terminal. The output terminal of the first operational amplifier 22a is connected through diodes 22b and 22c to the non-inverting input terminal of a second operational amplifier 22d connected with a voltage follower, and the output of the second operational amplifier 22d is fed back through a resistor 22e to the inverting terminal of the first operational amplifier 22a. The negative feedback circuit between the first and second operational amplifiers includes a diode 22f and a resistor 22g. The connection line between the diode 22c and the second operational amplifier 22d is connected to ground through a resistor 22h and capacitor 22i and also to the collector terminal of a transistor 22j which is operated by a CPU (to be described later) through a reset signal line 22k and a resistor 22l.

The peak hold circuit 22 is followed by the comparator 24 which is constituted of a third operational amplifier 24a having a voltage source 24b connected with its output terminal through a resistor 24c. The inverting terminal of the third operational amplifier 24a receives the output of the peak hold circuit 22 while the non-inverting terminal thereof is directly connected with the output terminal of the multiplexer 18. As a small difference is given for the inputs to the inverting and non-inverting terminals of the third operational amplifier 24a when the cylinder pressure maximizes, the comparator 24 outputs a pulse signal when the cylinder pressure peaks. (See FIG. 2.) As will also be noted from FIG. 2, the maximum cylinder pressure angle signal/knocking signal generator 20 is so arranged that in ordinary circumstances when knocking does not occur it produces a single pulse at the time the maximum pressure value is reached (FIG. 2(a)) and in cases where knocking occurs and a high frequency wave component is superposed on the waveform it produces a signal not only at the said time but also at each time thereafter that the output of the pressure sensor (multiplexer) comes to exceed the peak hold output (FIG. 2(b)). As the knocking frequency is about 10 times higher than the cylinder pressure frequency, the charging constant determined by the resistor 22h and the capacitor 22i is set so as to slow the operating speed to a level below the knocking frequency, as shown in FIG. 2(b).

The stage following the comparator 24 is the pulse trailing edge detector 26. This detector 26 is constituted of a resistor 26a, a capacitor 26b, a resistor 26c, an inverter 26d and a NOR gate 26e, and functions to detect the trailing edge of the comparator output and output a pulse of predetermined width for use in facilitating processing operations to be described later. (See FIG. 2.)

Therefore, by measuring the time lapse between a predetermined time point such as TDC (top dead center) and the time point at which the pulse is produced it is possible to determine the time point Tpmax at which the cylinder pressure peaks. The value Tpmax can then be converted into the maximum cylinder pressure angle $\theta$pmax. Moreover, by counting the number of pulses produced it can be determined whether or not knocking has occurred. Also, as shown in FIG. 2c), if the pressure sensor 12 should fail to function, this can be detected from the fact that no pulse is produced within the time measurement period.

The stage following the pulse trailing edge detector 26 is a microcomputer 30 having an input/output (I/0) terminal board 30a to which the output from the circuit 26 is applied. The microcomputer 30 serves as the means for computing the ignition timing and, in addition to the I/0 terminal board 30a, has an A/D converter 30b, a CPU 30c, a ROM (read-only memory) 30d and a RAM (random access memory) 30e. The microcomputer 30 is further equipped with a counter for counting the number of pulses output by the circuit 26, a timer counter for measuring the time lapse between the reference time point and the pulse generation time point, a cycle counter for counting the number of ignition cycles for knocking control, and an angle advance counter for counting the number of ignitions following discontinuance of knocking (none of which are shown). The aforesaid counters can, if desired, be incorporated internally in the CPU 30c.

A crankshaft angle sensor 32 is disposed in the vicinity of a crankshaft 34 or other rotating member of the internal combustion engine 10 to serve as a means for producing a crankshaft angle signal. The sensor 32 produces a cylinder identification signal once per predetermined angle of rotation of the crankshaft, namely, every 720° rotation of the crankshaft in a four-cylinder engine during which one cycle of power strokes are completed in the order of, for example, the first, third, fourth and second cylinders. It also produces TDC signals once every 180° rotation of the crankshaft at the time the respective pistons reach top dead center, and further at predetermined angle intervals, for example once every 30°, produces unit angle signals as subdivisions of the TDC angle signal. Therefore, by counting the number of TDC signals following production of the cylinder identification signal, it is possible to discriminate which cylinder is at TDC at the time the TDC signal is produced. Further, the engine rpm can be calculated from the unit angle signals. The output from the sensor 32 is first shaped in a wave-shaping circuit (not shown) and then input to the CPU 30c via the I/O terminal board 30a. As for the aforesaid cylinder identification signal, if desired, this can alternatively be obtained as a signal derived from a predetermined amplitude value obtained from the pressure sensor.

For detecting the load condition of the internal combustion engine 10, the engine can be further equipped with a negative pressure sensor 36 disposed downstream a throttle valve 38. This sensor 36 can be used together with the crankshaft angle sensor 32 to detect the operating condition of the engine, and can be used to backup any of the pressure sensors 12 that should malfunction or fail. Further, when used in the manner that will be explained later, the output of the sensor 36 may be used for computing a basic control value for ignition timing.

The stage following the control unit 14 is an ignition unit 40 consisting of an igniter, a distributor and the like. The output of the ignition unit is applied to ignition plugs (not shown) which ignites the fuel and air mixture in the engine combustion chamber. At an appropriate angle of rotation following the production of an output from the crankshaft angle sensor 32, the CPU issues a command through the reset signal line 22k for resetting the peak hold circuit 22, and also issues a gate switchover command to the multiplexer through a signal line 18a.

Figure 3:
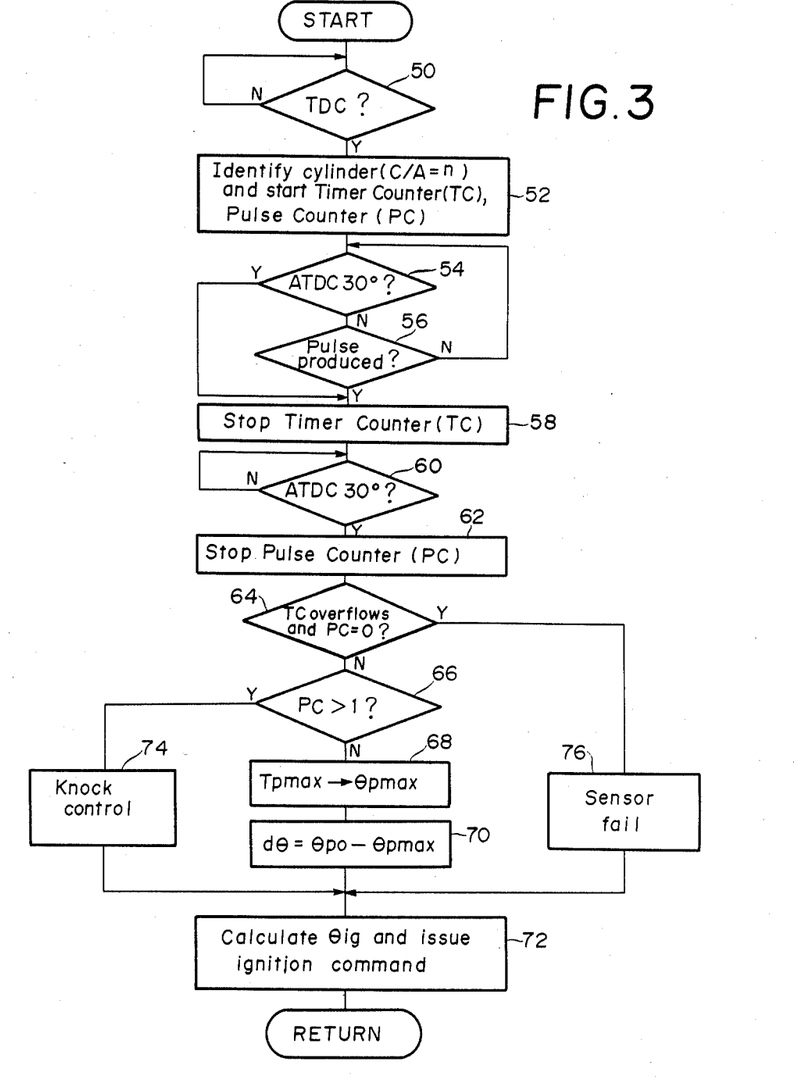
FIG. 3 is a flowchart indicating the operation of the device shown in FIG. 1.

The operation of the device according to the invention will now be explained with reference to the flowchart of FIG. 3 and the waveform diagrams of FIG. 2.

To begin with, arrival of the TDC signal is waited for in step 50. On its arrival, the procedure moves to step 52 in which the cylinder is identified and then specified by assigning it the address C/A=n and in which the timer counter (TC) and the pulse counter (PC) are started to initiate the time measurement and pulse count indicated in FIG. 2. It should be noted that cylinder identification is carried out because it is a feature of the invention that the ignition control is carried out separately for each cylinder. Here it is assumed that from a prescribed crankshaft angle BTDC (before top dead center) prior to this the output of the pressure sensor for the cylinder concerned was being received through the multiplexer 18.

Figure 4:
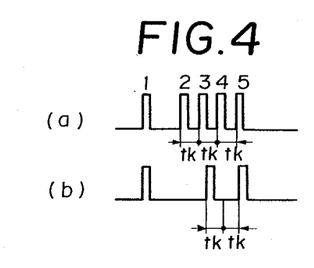

Next, from steps 54 to 58, if it is determined that even one pulse is produced within a predetermined angle ATDC, for example within 30° ATDC, the timer counter is stopped and then in steps 60 and 62 when arrival at 30° ATDC has been confirmed, the pulse counter is stopped. The pulse counting can be carried out simply by counting the produced pulses one by one or, as shown in FIG. 4, by counting them as the pulse level is progressively filtered at a period of tk. FIG. 4(a) and FIG. 4(b) show the cases where a plurality of pulses are produced as the result of knocking (FIG. 4(a)) and noise (FIG. 4(b)), respectively. The counting method using filtering eliminates pulses deriving from noise and for this reason is the more preferable. In view of the knocking frequency and other considerations, the period tk is set at, for example, 125 microsecond.

Next, in step 64 the contents of the timer counter and pulse counter are checked. If, as shown in FIG. 2(c), the number of pulses counted by the pulse counter is still zero in spite of the fact that the timer counter has measured a time lapse extending adequately beyond the point of maximum cylinder pressure, it can be decided that the pressure sensor did not operate normally. If this is not the case, it is determined in step 66 whether or not the pulse counter value has exceeded a prescribed value. Although the prescribed value is normally set at 1, if it is considered likely that because of noise a plurality of pulses may be produced even in the case of normal combustion, this value can be set at 2 or larger. When the pulse count value is smaller than the prescribed value, it is decided that knocking did not occur, and the maximum cylinder pressure angle $\theta$pmax is obtained in Step 68. For determining $\theta$pmax it is sufficient to multiply Tpmax, i.e. the time required for the crankshaft to rotate from the reference position to the position at which the cylinder pressure reaches maximum value, by a time-angle conversion factor obtained by the calculation of ((rpm)×360°)/60 sec. Then in step 70 the deviation d$\theta$ from the target maximum-pressure angle $\theta$po, which may for example be 15° ATDC, is calculated and in step 72 and an ignition timing $\theta$ig is calculated so as to eliminate the deviation to zero, whereafter an ignition command is sent to the ignition unit 40.

If the pulse counter value is found to have exceeded the prescribed value in step 66, this means that knocking has occurred. In this case, the procedure moves to step 74 in which a prescribed delay angle is determined irrespective of the presence/absence of the deviation d$\theta$. Then in step 72, the ignition timing $\theta$ig is determined on the basis of this delay angle, whereafter an ignition command is issued. Also, when the decision in step 64 is Yes, since this means that the pressure sensor is not working properly, the ignition is retarded by a prescribed angle to be on the safe side (steps 76, 72).

As the present invention makes it possible to detect the maximum pressure angle and the presence/absence of knocking using a single circuit 20, the circuitry is simple and inexpensive, and also has the advantage of providing high reliability.

Figure 5A:
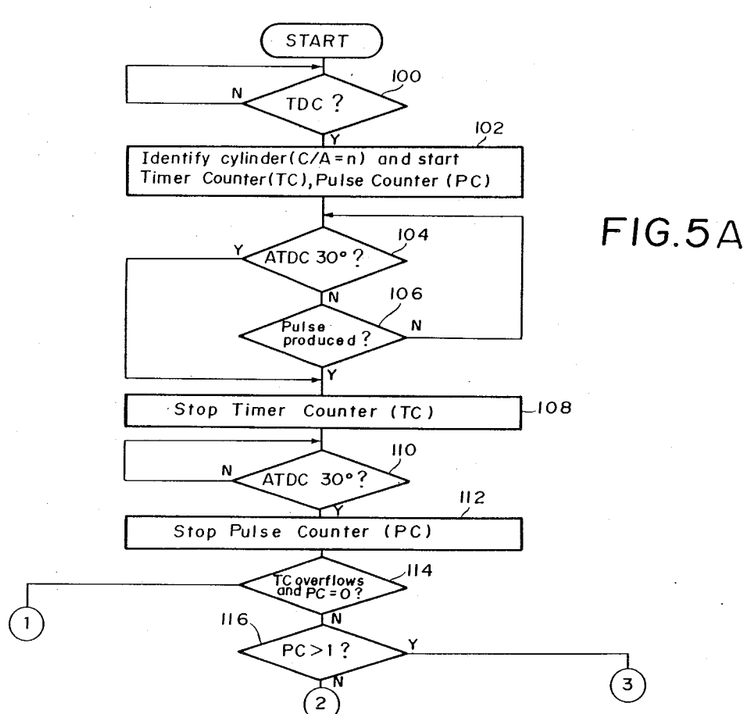
FIGS. 5A and 5B are a flowchart showing another example of the operation of the device shown in FIG. 1.
Figure 5B:
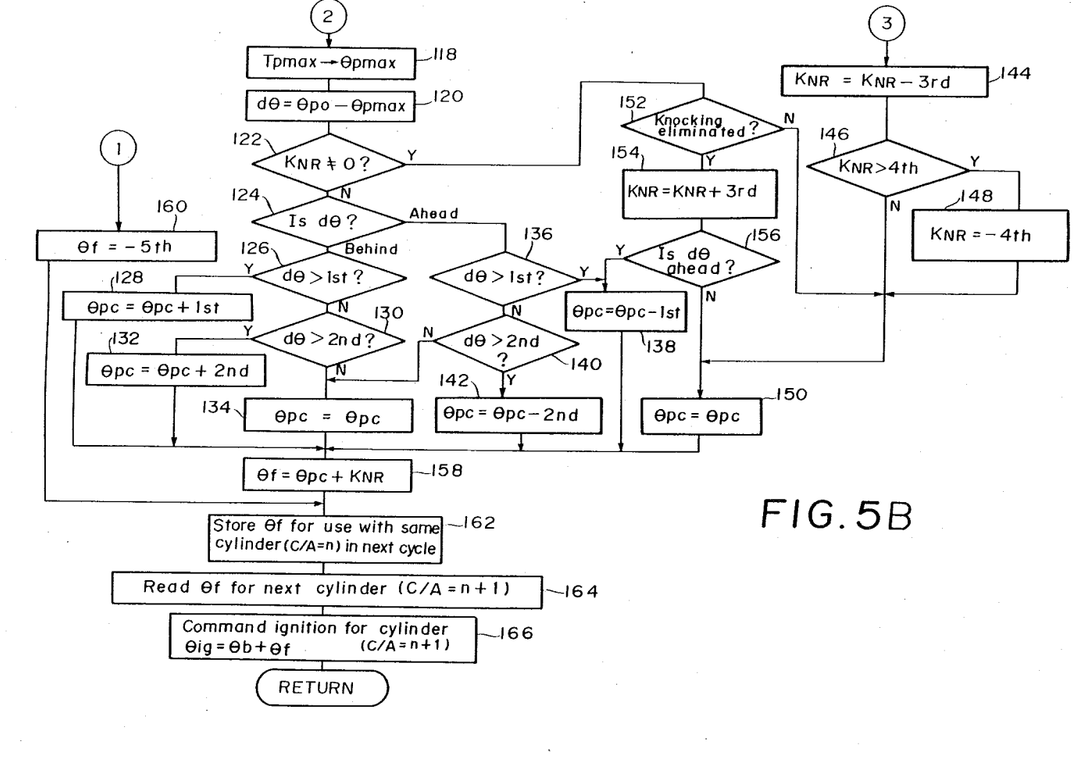

The flowchart of FIGS. 5A and 5B shows another example of the operation of the device illustrated in FIG. 1, which will be explained mainly in terms of how this operation differs from that represented by FIG. 3.

After completion of steps 100 to 116, i.e. after the pulse count value has been compared with a prescribed reference value, the procedure advances to step 118 if the pulse count value is smaller and the maximum cylinder pressure angle $\theta$pmax is calculated.

Next, the target maximum-pressure angle $\theta$po and the actual maximum pressure angle $\theta$pmax calculated in step 118 are compared to obtain the deviation d$\theta$ in step 120.

Then in step 122, it is determined whether or not the knocking compensation amount KNR (the initial setting being zero) is zero, which is done by checking the remaining knocking compensation amount stored in the RAM 30e. If the remaining amount is zero, the procedure moves to step 124 where it is determined whether the deviation d$\theta$ is ahead or behind with respect to the target maximumpressure angle $\theta$po, whereafter the appropriate adjustment is made. One of the features of this embodiment is that a plurality of unit amounts (angles) of regulation (compensation) are established. That is, one relatively large unit amount (angle) is established as a first prescribed angle and one relatively small unit amount (angle) is established as a second prescribed angle, and one or the other of these prescribed angles is used depending on the magnitude of the deviation d$\theta$.

More specifically, if the deviation d$\theta$ is decided to be "behind" in step 124, the procedure moves to step 126 where the deviation d$\theta$ is compared with the relatively larger first prescribed angle and if it is found to be larger than the first prescribed angle, the procedure moves to step 128 where, in order to advance the angle by a deviation compensation amount $\theta$pc, the first prescribed angle is added to the compensation amount in the preceding cycle (the initial setting being zero) and the result is used as the compensation amount $\theta$pc in the present cycle. If it is found to be smaller, the procedure moves to step 130 where the deviation d$\theta$ is compared with the second prescribed angle and if it is found to be larger than the second prescribed angle, the second prescribed angle is added to the compensation amount in the preceding cycle and the result is used as the compensation amount $\theta$pc in the present cycle (step 132). If it is found to be smaller than the second prescribed angle, the amount of compensation $\theta$pc is left unchanged (step 134). That is, as the first prescribed angle is set as a crankshaft angle of 3° and the second prescribed angle is set at 1°, there is no particular need to change the amount of compensation when the deviation is smaller than the second prescribed angle. It should be noted that in this flowchart, addition results in advancing the ignition timing while substraction results in retarding it.

In step 124 if the decision is that the deviation d$\theta$ is "ahead," the procedure moves to step 136 where the deviation d$\theta$ is compared with the first prescribed angle and if it is found to be larger than the first prescribed angle, the procedure moves to step 138 where the first prescribed angle is subtracted from the compensation amount $\theta$pc in the preceding cycle to carry out retarding compensation. If it is found to be smaller, the procedure moves to step 140 where the deviation d$\theta$ is compared with the second prescribed angle and if it is found to be larger than the second prescribed angle, the procedure moves to step 142 where the second prescribed angle is subtracted from the compensation amount $\theta$pc in the preceding cycle to carry out retarding compensation. If the deviation is found not to be larger than the second prescribed angle, the procedure moves to step 134 where, for the same reason as explained above, no change is made in the amount of compensation. While only first and second prescribed angles are established as unit angles of compensation in this embodiment, it should be understood that additional unit angles can be established to enable finer degrees of change between successive compensation amounts.

When knocking is detected in step 116, the procedure moves to step 144 where a third prescribed angle of appropriate magnitude is immediately subtracted from the knocking compensation amount KNR (which is initially set at zero), whereafter, in steps 146 and 148, retarding of the ignition timing angle is ontinued until the amount of retarding compensation reaches a fourth prescribed angle (set to be larger than the third compensation angle) and the deviation compensation amount $\theta$pc is again used for compensation of the current ignition timing (step 150). In step 122, if the remaining knocking compensation amount KNR is not zero, it is first determined when a prescribed time period has lapsed or a prescribed number of ignitions have occurred following the end of knocking and the ignition timing is then progressively returned in the direction of advance in increments of the third prescribed angle (steps 152 and 154). When the deviation d$\theta$ is "ahead" with respect to the target maximum-pressure angle, as there is no need return the ignition timing in the advance direction, the compensation amount $\theta$pc is retarded by the amount of the first prescribed angle (steps 156 and 138). When it is "behind," the compensation amount $\theta$pc is left unchanged (step 150). Measurement of the time (number of ignitions) following the end of knocking can be carried out using the cycle counter and the advance angle counter in the computer 30.

Next, in step 158, the value obtained by adding the compensation amount $\theta$pc and the knocking compensation amount KNR is defined as feedback compensation amount $\theta$f (initially set at zero). As the amount KNR represents a negative amount, its "addition" substantially results in a subtraction, that is to say in retardation of the ignition timing angle. When sensor failure is determined in step 114, an appropriately set fifth prescribed angle for retarding the ignition timing is set as the feedback compensation amount $\theta$f (step 160).

Next in step 162, so as to be able to use the so-obtained feedback compensation amount $\theta$f as the compensation value in the succeeding cycle of the same cylinder (cylinder address C/A=n), the amount $\theta$f is once stored in the RAM 30e (or used to replace any amount already stored in the RAM 30e). Therefore, since all of the compensation amounts obtained by the aforesaid procedures, including the knocking compensation amount, will be reflected only in the control of the cylinder concerned, it becomes possible to carry out control separately for each cylinder in accordance with the particular state of combustion thereof.

Next in step 164, the compensation amount $\theta$f for the next cylinder to fire (cylinder address C/A=n+1) that was stored in the RAM 30e during the preceding cycle of this cylinder is read and an ignition command is issued for this cylinder (step 166). The command at this time specifies the ignition timing $\theta$ig as the basic ignition timing $\theta$b+the fed-back compensation amount $\theta$f.

By making the amount of compensation variable in this way, it becomes possible to converge the actual maximum-pressure angle toward the target maximum-pressure angle smoothly and as quickly as the convergence can possibly be carried out without causing degradation of drivability due to abrupt changes in ignition timing.

As for the basic ignition timing $\theta b$ mentioned in connection with step 166, this is set solely with reference to the cylinder pressure, in which case it is set relative to the target peak-pressure angle $\theta po$. Alternatively, the basic value $\theta b$ may be retrieved from mapped values in accordance with the engine rpm and load condition as determined from the outputs of the crankshaft angle sensor 32 and load sensor 36. In the latter case although the basic ignition timing is set based on the engine rpm and load and is stored as mapped values in the ROM 30d, this can be advantageously realized since the arrangement is such that following ignition the deviation of the actual maximum cylinder pressure angle from the target maximum-pressure angle is detected and then used for compensating the mapped value in preparation for the succeeding ignition. As the target maximum-pressure angle is approached by repeating this feedback control process in successive cycles, only a small number of values need be mapped in the ROM 30d, meaning that the capacity of this memory need not be large.

Figure 6A:
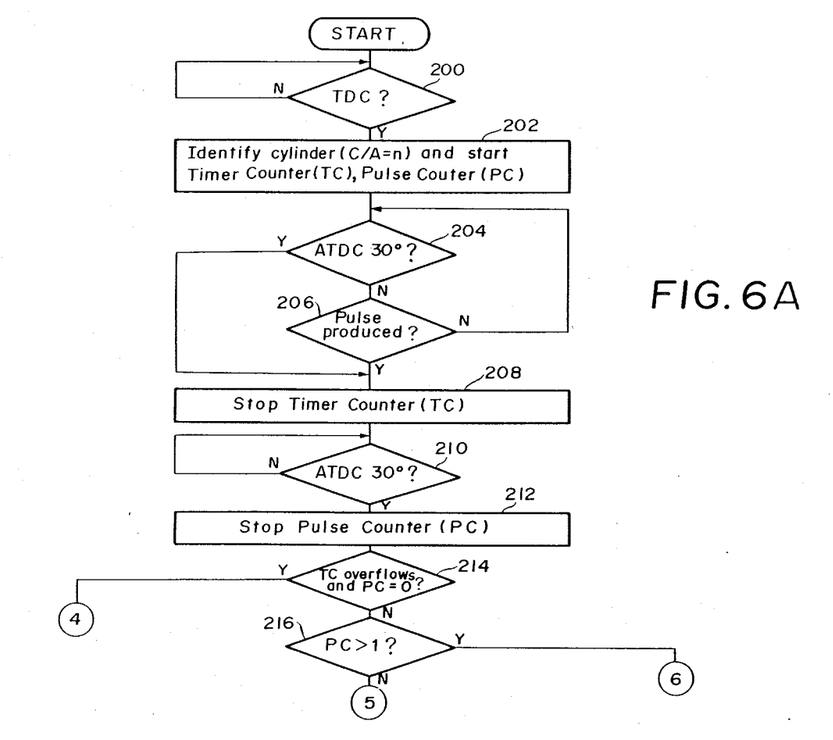
FIGS. 6A and 6B are a flowchart showing still another example of the operation of the device shown in FIG. 1.
Figure 6B:
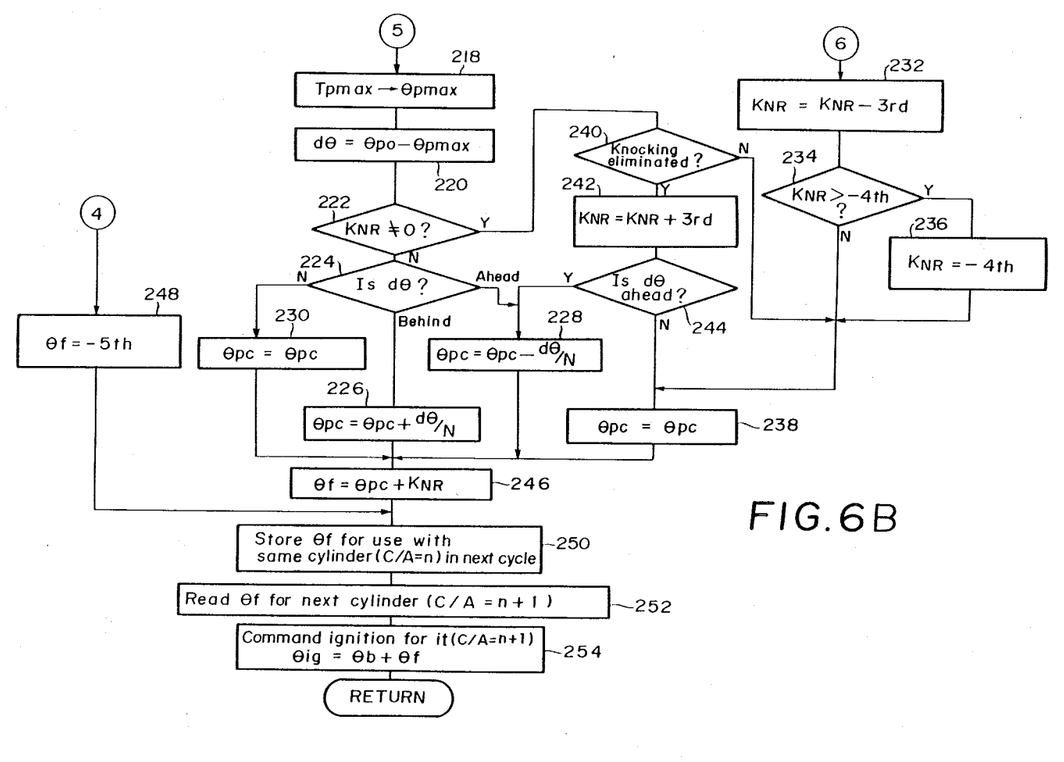

The flowchart shown in FIGS. 6A and 6B illustrates another example of the operation of the device according to this invention, which will be explained mainly in terms of how this operation differs from that represented by the flowchart of FIGS. 5A and 5B. After obtaining $d\theta$ from step 200 to step 220, in step 222, if it is found that there is no remaining knocking compensation amount KNR, it is next determined in step 224 whether the deviation $d\theta$ is "behind" or "ahead." If it is "behind," the ignition timing angle is advanced by addition of the product obtained by dividing the deviation $d\theta$ by N (step 226), and if it is "ahead," the ignition timing angle is retarded by substraction of the same amount (step 228). Where it is neither "behind" nor "ahead," the compensation amount is left unchanged (step 230). Here N is a variable whose value depends on the magnitude of the deviation $d\theta$, and, similarly to the case of the flowchart of FIG. 5, the amount of compensation is large when the deviation is large and is small when the deviation is small. The variable N can, for example, be set as follows.

| Deviation $d\theta$ (degrees) | N | Compensation angle (degrees) |
|---|---|---|
| <0.5 | >> | 0 (dead band) |
| <2.0 | 2.0 | 1.0 |
| <4.0 | 1.6 | 2.5 |
| <6.0 | 1.5 | 4.0 |

The remaining steps in this operational mode are the same as those in the flowchart of FIG. 5.

Figure 7:
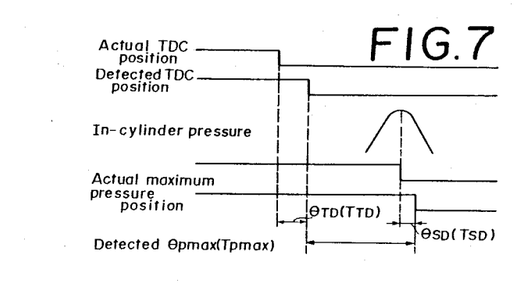
FIG. 7 is a waveform diagram for explaining a method of adjusting the value output by the pressure detector.

As shown in the diagram in FIG. 7, the detection by the pressure sensors is actually somewhat delayed. That is, in the detection of TDC there arises a time or angular delay ($\theta T$ or TTD), while in the detection of the maximum pressure position there arises a time or angular delay ($\theta SD$ or TSD). Therefore, the actual maximum pressure angle $\theta pmaxACT$ has to be derived by the calculation: $\theta pmaxACT = \theta TD + (\theta pmax - \theta SD)$.

Figure 8:
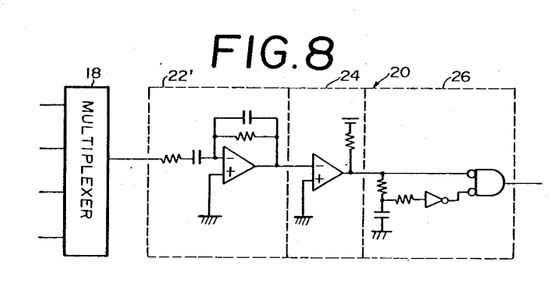
FIG. 8 is a block diagram of one section of a second embodiment of the device according to the invention.
Figure 9:
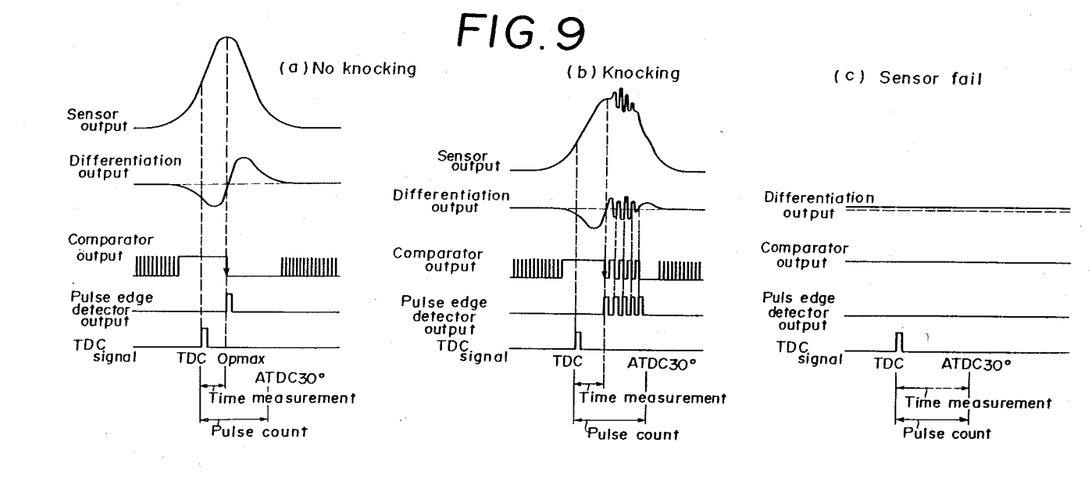

FIG. 8 is a partial view of another embodiment of the device according to this invention, the remaining portions of which are identical with those of FIG. 1. In this embodiment, the peak hold circuit 22 of the maximum cylinder pressure angle signal/knocking signal generator 20 in FIG. 1 is replaced with a differentiation circuit 22', the output waveforms of which are shown in FIG. 9. The differentiation circuit receives the output of the multiplexer 18 and as shown in FIG. 9, its output crosses zero at the time the waveform from the multiplexer reaches the position of maximum cylinder pressure and at the portion thereof superposed with the knocking frequency. This output is forwarded through the comparator 24 to the pulse trailing edge detector 26, which outputs a pulse of predetermined width. Otherwise the device according to this embodiment is the same as that illustrated in FIG. 1.

The present invention has thus been shown and described with reference to specific embodiments. However, it should be noted that the present invention is in no way limited to the details of the described arrangements but changes and modifications may be made without departing from the scope of the appended claims.

What is claimed is:

1. A device for controlling ignition timing in a multi-cylindered internal combustion engine, comprising:
   (a) pressure sensors disposed in the vicinity of each combustion chamber of the engine for detecting pressure variation in the chamber;
   (b) a crankshaft angle sensor disposed in the vicinity of a rotating member of the engine for detecting the angular position of the crankshaft;
   (c) filtering means connected to the pressure sensors, said filtering means for passing pressure sensor output signals in a transmission band extending up to and including knocking frequencies;
   (d) pulse generating means connected to the filtering means for generating a pulse at every peak output by the pressure sensors;
   (e) knocking and maximum pressure angle detecting means, connected to the pulse generating means, said knocking and maximum pressure angle detecting means for counting each pulse generated by said pulse generating means and for determining that knocking has occurred when the number of counted pulses exceeds a predetermined value, and said knocking and maximum pressure angle detecting means, being further connected to the crankshaft angle sensor, for determining the maximum pressure angle at which the combustion chamber pressure becomes maximum based upon the detected angular position of the crankshaft and based upon the counted pulses;
   (f) ignition timing calculating means, connected to the knocking and maximum pressure angle detecting means and crankshaft angle sensor, for separately calculating ignition timing of the engine for each combustion chamber, said ignition timing calculating means retarding the ingition timing when knocking is detected and said ignition timing calculating means calculating the deviation of the maximum pressure angle from a predetermined target angle and compensating the ignition timing to decrease the deviation when knocking is not detected; and
   (g) ignition means connected to the ignition timing calculating means for igniting a fuel and air mixture in each combustion chamber.

2. A device according to claim 1, further including means for detecting failure of the pressure sensors connected between the knocking and maximum pressure angle detecting means and the ignition timing calculating means, said sensor failure detecting means determining sensor failure when no pulse is generated for a predetermined angular range and when the sensor failure is determined, the ignition timing calculating means retarding the ignition timing by a predetermined value.

3. A device according to claim 1, wherein said pulse generating means includes a peak hold circuit which holds the peak output of the filtering means and a comparator connected in series to the circuit, said comparator further receiving the output of the filtering means and generating a pulse when the filtering means output exceeds the circuit output in voltage.

4. A device according to claim 3, further including a pulse trailing edge detector connected to the comparator for producing a pulse of a predetermined width.

5. A device according to claim 3, wherein a multiplexer is provided between the filtering means and the peak hold circuit for sequentially forwarding the filtering means output to the circuit in the firing order of the engine.

6. A device according to claim 1, wherein said knocking and maximum pressure angle detecting means determines the maximum pressure angle by measuring time lapse from a reference angle and then by converting the measured time into an angular value.

7. A device according to claim 1, wherein an amount of the compensation is proportional to the deviation.

8. A device according to claim 7, wherein the compensation amount is determined by comparing the deviation with a predetermined unit angle.

9. A device for detecting knocking and maximum pressure angle in an internal combustion engine comprising:
(a) a pressure sensor disposed in the vicinity of the combustion chamber of the engine for detecting pressure variation in the chamber;
(b) a crankshaft angle sensor disposed in the vicinity of a rotating member of the engine for detecting the angular position of the crankshaft;
(c) a filtering means connected to the pressure sensor, said filtering means for passing pressure sensor output signals in a transmission band extending up to and including knocking frequencies;
(d) a pulse generating means connected to the filtering means for generating a pulse at every peak output by the pressure sensors; and
(e) a knocking and maximum pressure angle detecting means, connected to the pulse generating means, said knocking and maximum pressure angle detecting means for counting each pulse generated by said pulse generating means and for determining that knocking has occurred when the number of counted pulses exceeds a predetermined value, said knocking and maximum pressure angle detecting means, being further connected to the crankshaft angle sensor, for determining the maximum pressure angle at which the combustion chamber pressure becomes maximum based upon the angular position of the crankshaft and the number of counted pulses.

10. A device according to claim 9, wherein said pulse generating means includes a peak hold circuit which holds the peak output of the filtering means and comparator connected in series of the circuit, said comparator further receiving the output of the filtering means and generatging a pulse when the filtering means output exceeds the circuit output in voltage.

11. A device according to claim 10, further including a pulse trailing edge detector connected to the comparator for producing a pulse of a predetermined width.

12. A device according to claim 9, wherein said knocking and maximum pressure angle detecting means determines the maximum pressure angle by measuring time lapse from a reference angle and then by converting the measured time into an angular value.

* * * * *